(12) United States Patent
Secrest et al.

(10) Patent No.: US 11,277,089 B2
(45) Date of Patent: Mar. 15, 2022

(54) COMPENSATION FOR MULTIPLE NON-IDEAL POSITION SENSOR HARMONIC COMPONENTS IN A ROTARY SYSTEM

(71) Applicant: BorgWarner Inc., Auburn Hills, MI (US)

(72) Inventors: Caleb Wayne Secrest, Noblesville, IN (US); Siddharth Ballal, Fishers, IN (US)

(73) Assignee: BORGWARNER INC., Auburn Hills, MI (US)

( * ) Notice: Subject to any disclaimer, the term of this patent is extended or adjusted under 35 U.S.C. 154(b) by 0 days.

(21) Appl. No.: 16/943,355

(22) Filed: Jul. 30, 2020

(65) Prior Publication Data

US 2022/0038041 A1   Feb. 3, 2022

(51) Int. Cl.
| | | |
|---|---|---|
| *G01D 5/244* | (2006.01) | |
| *H02P 29/50* | (2016.01) | |
| *B60L 15/02* | (2006.01) | |
| *H02P 21/14* | (2016.01) | |
| *H02P 6/16* | (2016.01) | |

(52) U.S. Cl.
CPC ............ *H02P 29/50* (2016.02); *B60L 15/025* (2013.01); *H02P 6/16* (2013.01); *H02P 21/14* (2013.01)

(58) Field of Classification Search
CPC .. H02P 29/50; H02P 6/16; H02P 21/14; B60L 15/025; G01D 5/244
See application file for complete search history.

(56) References Cited

U.S. PATENT DOCUMENTS

| | | | |
|---|---|---|---|
| 2015/0158396 A1* | 6/2015 | Walters | B60W 50/02 701/22 |
| 2017/0343384 A1* | 11/2017 | Nakazato | G01D 5/244 |
| 2019/0031046 A1* | 1/2019 | Secrest | B60L 15/025 |

* cited by examiner

*Primary Examiner* — Cortez M Cook
(74) *Attorney, Agent, or Firm* — Cantor Colburn LLP

(57) ABSTRACT

Examples described herein provide a rotary system that includes a rotor having an axis of rotation, a position sensor to measure an angular position of the rotor with respect to the axis of rotation, and a processing system to perform operations. The operations include receiving an output from the position sensor, the output being a measure of an angular position of the rotor with respect to the axis of rotation. The operations further include generating, based on the output from the position sensor, an error signal, an estimated angular velocity, and an estimated position. The operations further include performing a position sensor harmonic adaptation based at least in part on the error signal, the estimated angular velocity, and the estimated position to generate adaptation coefficients. The operations further include performing a position sensor harmonic compensation based on the adaptation coefficients and the estimated position to generate a difference in position.

19 Claims, 6 Drawing Sheets

COMPENSATION FOR MULTIPLE NON-IDEAL POSITION SENSOR HARMONIC COMPONENTS IN A ROTARY SYSTEM

BACKGROUND OF THE INVENTION

Exemplary embodiments pertain to the art of electric motors and, more particularly to compensation for multiple non-idea position sensor harmonic components in a rotary system.

Rotary systems, such as electric motors, that are employed as prime movers in a motor vehicle typically include a rotor that rotates about an axis of rotation. In some situations, a position sensor (or multiple position sensors) is used to measure the precise angular position of the rotor. Knowledge of the angular position of the rotor is useful for controlling and monitoring the electric motor.

BRIEF DESCRIPTION OF THE INVENTION

Embodiments of the present invention are directed to compensation for multiple non-idea position sensor harmonic components in a rotary system.

A non-limiting example rotary system includes a rotor having an axis of rotation. The rotary system further includes a position sensor to measure an angular position of the rotor with respect to the axis of rotation. The rotary system further includes a processing system. The processing system includes a memory having computer readable instructions and a processing device for executing the computer readable instructions, the computer readable instructions controlling the processing device to perform operations. The operations include receiving an output from the position sensor, the output being a measure of an angular position of the rotor with respect to the axis of rotation. The operations further include generating, based on the output from the position sensor, an error signal, an estimated angular velocity, and an estimated position. The operations further include performing a position sensor harmonic adaptation based at least in part on the error signal, the estimated angular velocity, and the estimated position to generate adaptation coefficients. The operations further include performing a position sensor harmonic compensation based on the adaptation coefficients and the estimated position to generate a difference in position.

A non-limiting example method includes receiving, by a processing system, an output from a position sensor associated with a rotor. The rotor has an axis of rotation, and the output is a measure of an angular position of the rotor with respect to the axis of rotation. The method further includes generating, by the processing system, based on the output from the position sensor, an error signal, an estimated angular velocity, and an estimated position. The method further includes performing, by the processing system, a position sensor harmonic adaptation based at least in part on the error signal, the estimated angular velocity, and the estimated position to generate adaptation coefficients. The method further includes performing, by the processing system, a position sensor harmonic compensation based on the adaptation coefficients and the estimated position to generate a difference in position. The method further includes controlling, by the processing system, the rotor based at least in part on the difference in position.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures. In particular, embodiments described herein provide a computationally efficient approach to compensate multiple non-ideal position sensor harmonic components over a wide speed operating range of an electric motor.

While controlling electric motors, which may be alternating current (AC) electric motors, non-ideal position sensor harmonics can create torque/power ripples. These torque/power ripples can result in noise, vibration, and harshness (NVH) that can degrade overall system control. Conventional techniques for compensating non-ideal position sensor properties are computationally cumbersome and may not work for multiple harmonic components. Furthermore, such conventional techniques provide inconsistent and/or poor convergence properties as a function of operating speed of the electric motor.

In an effort to cure these and other deficiencies of the prior art, one or more embodiments described herein provide a computationally efficient approach of simultaneously addressing multiple non-ideal position sensor harmonics. According to one or more embodiments described herein, the present techniques produce consistently fast convergence properties over the entire operating speed range of the electric motor while reducing computational complexity compared to the prior art. In particular, the techniques described herein are computationally efficient in that they can provide meaningful results in real-time (or near-real-time) without excessive system resources. The present techniques are also adaptive over the entire operating speed range of the electric motor, and they offer fast and reliable learning for position sensor harmonics. Further, the present techniques are applicable to different sensor classes of positional sensors. That is, the present techniques are generally applicable to positional sensors.

Figure 1:
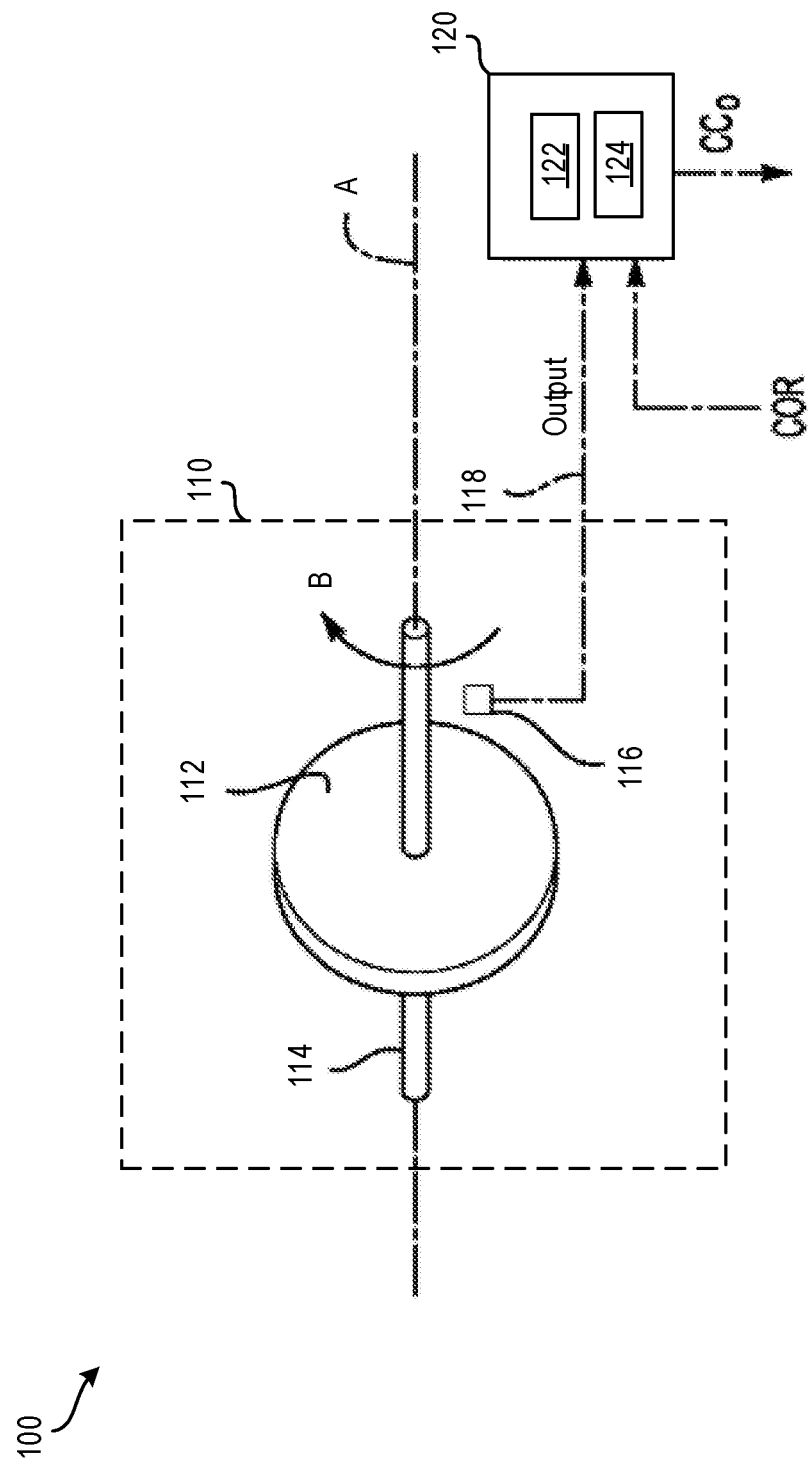
FIG. 1 depicts a schematic diagram of a rotary system having a motor and a processing system according to one or more embodiments described herein.

FIG. 1 depicts a schematic diagram of a rotary system 100 having a motor 110 and a processing system 120 according to one or more embodiments described herein. In some examples, the motor 110 is an electric motor, such as an alternating current (AC) motor. The motor 110 can include a rotor 112 coupled to a shaft 114. The rotor 112 rotates about an axis of rotation A in a direction shown by arrow B. It should be appreciated that the techniques described herein work independent of rotational direction, and the direction shown by arrow B is merely an example. When rotating, the rotor 112 causes the shaft 114 to rotate about the axis of rotation A. The shaft 114 can be coupled to a device (not shown) to cause the device to receive torque from the motor 110 via the shaft 114.

The motor 110 can also include a position sensor 116. The position sensor 116 senses an angular position of the rotor 112 with respect to the axis of rotation A as the rotor 112 rotates about the axis of rotation A and generates a sensor output 118 indicative of the position. As described above, non-ideal position sensor harmonics can degrade overall control of the rotor system. Such degraded control of the rotor system creates undesirable torque/power ripples.

The sensor 116 is communicatively coupled to the processing system 120 such that the sensor 116 can send the sensor output 118 (i.e., the sensed angular position) to the processing system 120. The processing system 120 includes a processing device (or "processor") 122 and a memory 124. The features and functionality described herein can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the features and functionality described herein can be a combination of hardware and programming. The programming can be processor executable instructions stored on a tangible memory (e.g., the memory 124), and the hardware can include the processing device 122 for executing those instructions. Thus the memory 124 can store program instructions that when executed by the processing device 122 implement the features and functionality described herein.

Figure 2:
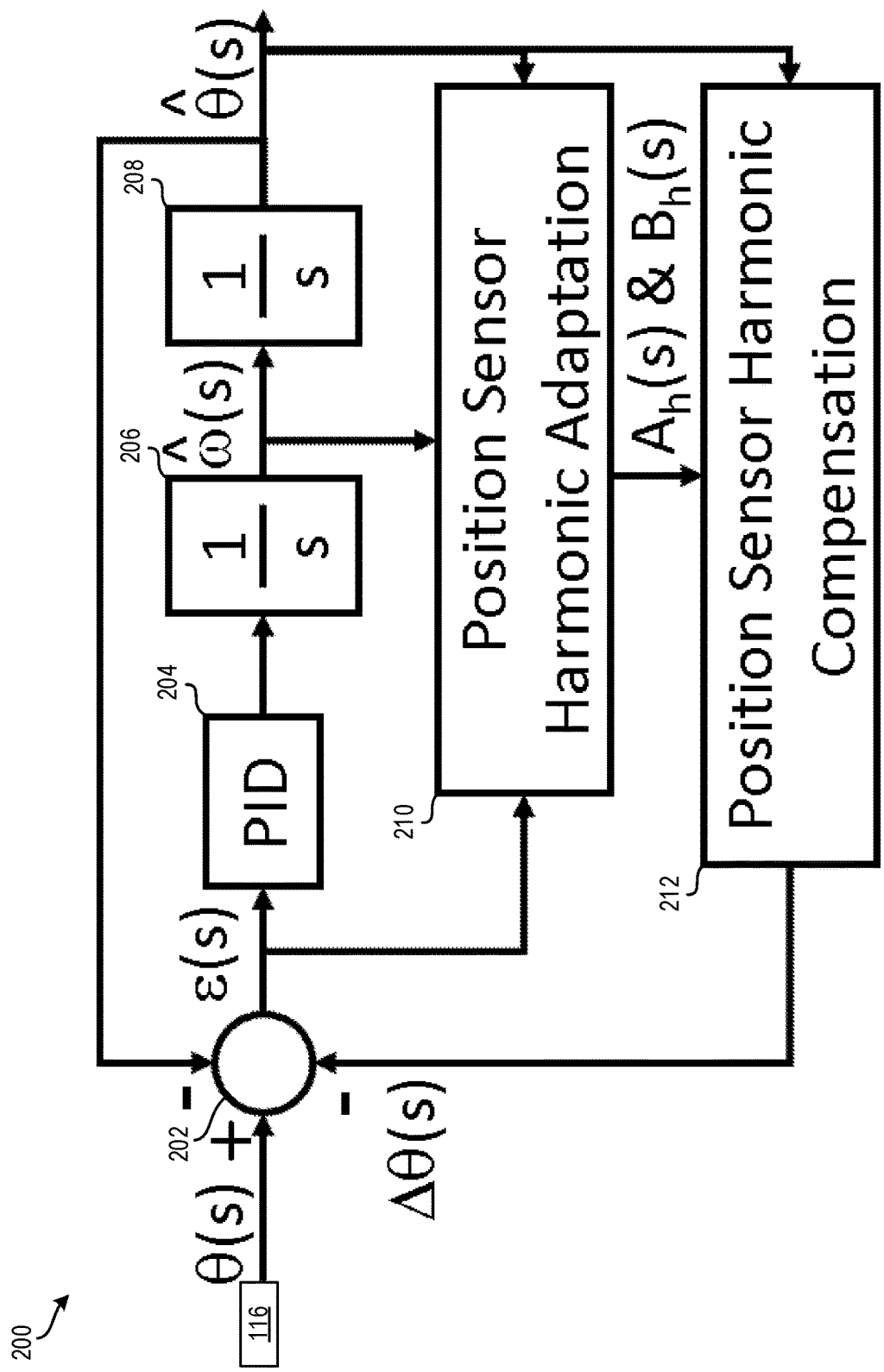
FIG. 2 depicts a block diagram of a control system for a computationally efficient approach to compensate for multiple non-ideal position sensor harmonic components for the rotary system of FIG. 1 according to one or more embodiments described herein.

According to one or more embodiments described herein, the processing system 120 implements a control system, such as the control system 200 of FIG. 2. In particular, FIG. 2 depicts a block diagram of a control system 200 for a computationally efficient approach to compensate for multiple non-ideal position sensor harmonic components for a rotary system (e.g., the rotary system 100 of FIG. 1) according to one or more embodiments described herein.

As described herein, the position sensor 116 senses angular position of the rotor 112 with respect to the axis of rotation A as the rotor 112 rotates about the axis of rotation A and generates the sensor output 118 ($\theta(s)$) indicative of the position of the rotor 112. The sensor output 118 is fed into the control system 200 at summer 202. The summer 202 generates an error signal ($\varepsilon(s)$) that is fed into a proportional-integral-derivative (PID) controller 204 and a position sensor harmonic adaptation block 210. The PID controller 204 acts on the error signal ($\varepsilon(s)$) by applying proportional, integral, and derivative terms. Output of the PID controller 204 is then integrated by a first integrator 206 to generate an estimated angular velocity ($\hat{w}(s)$) which is fed into a second integrator 208 and a position sensor harmonic adaptation block 210. The second integrator 208 integrates the estimated angular velocity ($\hat{w}(s)$) to generate an estimated position ($\hat{\theta}(s)$), which is fed into the position sensor harmonic adaptation block 210 and a position sensor harmonic compensation block 212.

The position sensor harmonic adaptation block 210 receives the error signal (c(s)), the estimated angular velocity ($\hat{w}(s)$), and the estimated position ($\hat{\theta}(s)$) and generates harmonic adaptation coefficients ($A_h(s)$ and $B_h(s)$), which are then passed to the position sensor harmonic compensation block 212. The position sensor harmonic adaption block 210 is described in more detail with reference to FIG. 3.

The position sensor harmonic compensation block 212 receives the estimated position ($\hat{\theta}(s)$) from the second integrator 208 as well as the harmonic adaptation coefficients ($A_h(s)$ and $B_h(s)$) from the position sensor harmonic adaptation block 210. The position sensor harmonic compensation block 212 generates a difference in position ($\Delta\theta(s)$), which, when included in summer 202, seeks to eliminate the selected pure harmonic content from the error signal ($\varepsilon(s)$). The position sensor harmonic compensation block 212 is described in more detail with reference to FIG. 4.

The position sensor harmonic adaptation block 210 and the position sensor harmonic compensation block 212 are now described in more detail with reference to FIGS. 3 and 4 respectively. The position sensor harmonic adaptation block 210 and the position sensor harmonic compensation block 212 are separated in the control system 200 to improve computational efficiency of the control system 200 because these blocks can operate at different task rates. For example, coherent data is passed to a slower task rate performed by the position sensor harmonic adaptation block 210, which generates the adaptation coefficients ($A_h(s)$ and $B_h(s)$). These coefficients are then passed from the position sensor harmonic adaptation block 210 to the position sensor harmonic compensation block 212, which operates at a faster task rate to perform harmonic adaptation. That is, the coefficients are passed to the faster task rate when the harmonic compensation is calculated and applied. This bifurcated approach improves computational efficiency (and thus improves the functionality of computer processing systems) by separating tasks performed at a slower task rate (i.e., the adaptation) from tasks performed at a faster task rate (i.e., the compensation). This enables the position sensor harmonic compensation to operate more quickly without requiring additional processing resources that would be needed to perform the position sensor harmonic adaptation at the same fast rate.

Figure 3:
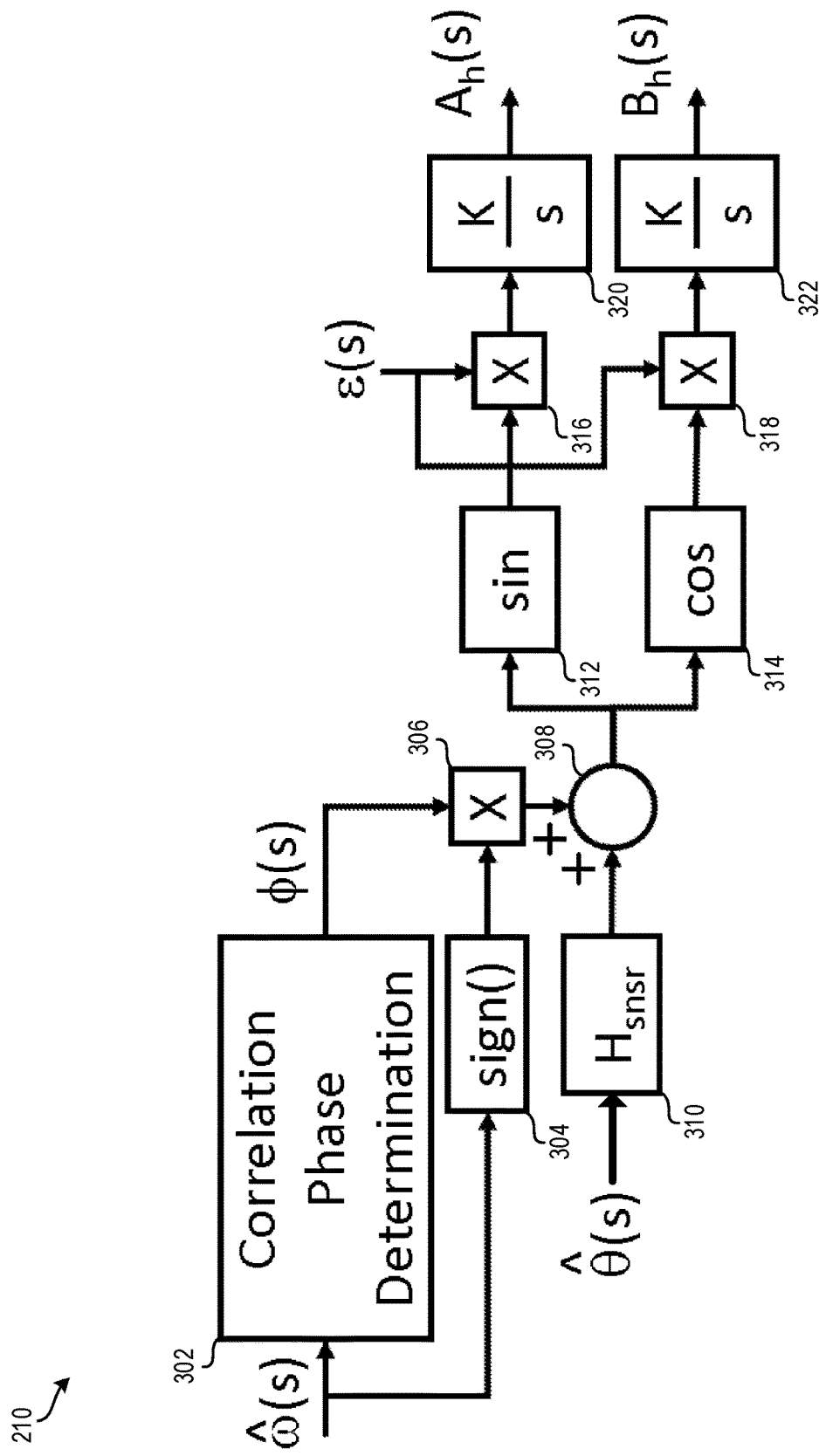
FIG. 3 depicts a block diagram of a position sensor harmonic compensation block of the control system of FIG. 2 according to one or more embodiments described herein.
Figure 5:
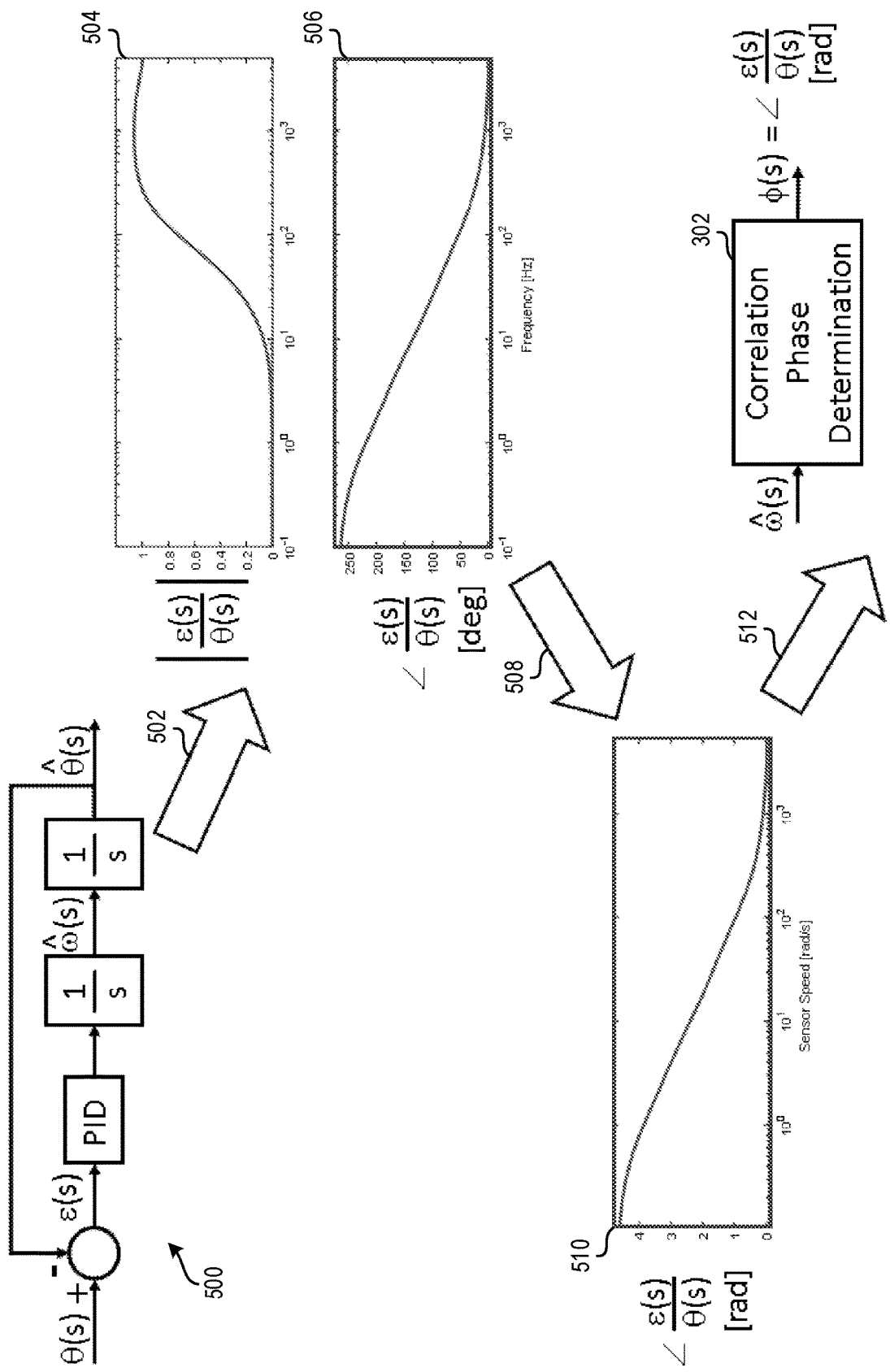
FIG. 5 depicts a diagram of performing correlation phase determination of FIG. 3 in order to account for constantly changing phase of the error signal (c(s)) according to one or more embodiments described herein.

FIG. 3 depicts a block diagram of a position sensor harmonic adaptation block 210 of the control system 200 of FIG. 2 according to one or more embodiments described herein. The position sensor harmonic adaptation block 210 receives the estimated angular velocity ($\hat{w}(s)$), which is input into a correlation phase determination block 302 and a sign block 304. The correlation phase determination block 302 is further described in FIG. 5. In particular, FIG. 5 depicts a diagram of performing correlation phase determination at block 302 of FIG. 3 in order to account for constantly changing phase of the error signal (c(s)).

A control system 500 (similar to the control system 200 of FIG. 2) is used. At arrow 502, the magnitude and phase relationship between the sensor output 118 ($\theta(s)$) from the position sensor 116 and the error signal (c(s)) is calculated as shown in the frequency graph 504 and 506, respectively. At arrow 508, phase is converted from degrees to radians and frequency is converted into sensor speed based on the following equation SensorSpeed=$2\pi f/H_{snsr}$, where "f" is the frequency and "$H_{snsr}$" is the harmonic order of the position sensor 116 which is seeking to be eliminated, with the results shown in graph 510. At arrow 512, the phase relationship is directly applied in the correlation phase determination block 302. Thus, the correlation phase determination block 302 takes as input the estimated angular velocity ($\hat{w}(s)$) and generates a phase angle ($\phi(s)$) in radians. The correlation phase determination can be calculated online or applied via look-up tables or a polynomial approximation, for example. Convergence can be ensured when the phase relationship is accurate within +/−45 degrees (i.e., +/−π/4 radians) of the relationship resulting from graph 510.

With continued reference to FIG. 3, the sign block 304 accounts for the direction of rotation of the rotor about the axis of rotation with positive representing one direction of rotation and negative representing the opposite direction of rotation. The output of the sign block 304 and the phase angle ($\phi(s)$) generated by the correlation phase determination block 302 are multiplied at multiplier 306 and then summed at summer 308 with the angle of the position sensor harmonic output from block 310. The output of block 310 is the product of the estimated position ($\hat{\theta}(s)$) (see FIG. 2) and $H_{snsr}$, which represents a gain block.

The output of the summer 308 is used to generate sine and cosine waves at blocks 312 and 314 respectively. The error signal ($\varepsilon(s)$) is applied to the waves generated by the sine block 312 and the cosine block 314 at the multipliers 316 and 318, and results of the multipliers 316 and 318 are multiplied by gain "K" and integrated at integrators 320 and 322 to generate the respective harmonic adaptation coefficients ($A_h(s)$ and $B_h(s)$).

Figure 4:
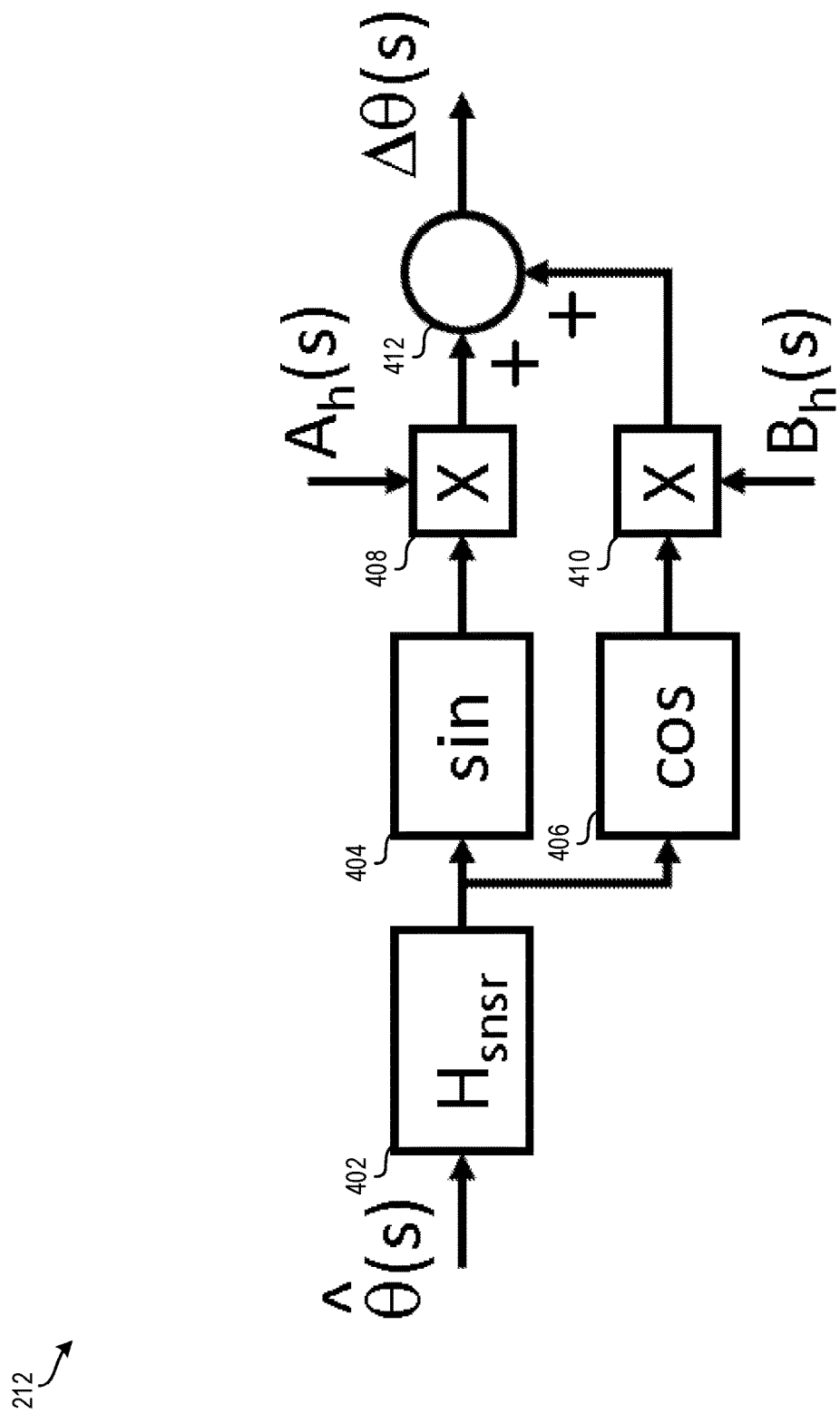
FIG. 4 depicts a block diagram of a position sensor harmonic application block of the control system of FIG. 2 according to one or more embodiments described herein.

FIG. 4 depicts a block diagram of a position sensor harmonic compensation block 212 of the control system 200 of FIG. 2 according to one or more embodiments described herein. The position sensor harmonic compensation block 212 receives the estimated position ($\hat{\theta}(s)$), which is fed into block 402 representing the harmonic of the position sensor 116 ($H_{snsr}$). The output of block 402 is fed into sine block 404 and cosine block 406 to convert the angle into sine and cosine waves, $\sin(H_{snsr}\hat{\theta})$ and $\cos(H_{snsr}\hat{\theta})$, respectively. The output of the sine block 404 and the cosine block 406 are multiplied at blocks 408 and 410 with the respective harmonic adaptation coefficients ($A_h(s)$ and $B_h(s)$) from the position sensor harmonic adaptation block 210. The outputs of the blocks 408 and 410 are summed by the summer 412 to generate the difference in position ($\Delta\theta(s)$).

Figure 6:
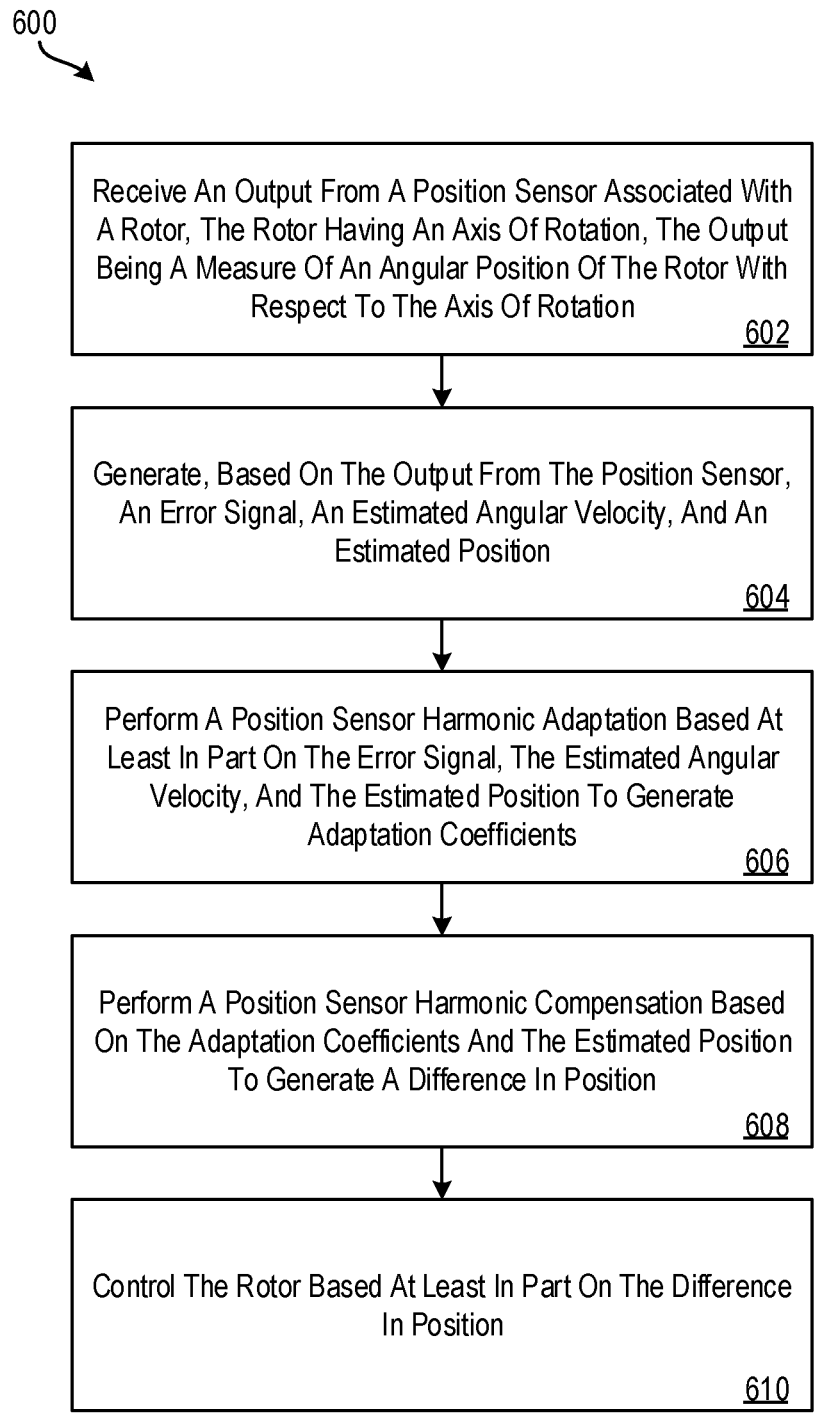
FIG. 6 depicts a flow diagram of a method for compensating for multiple non-ideal position sensor harmonic components for the rotary system of FIG. 1 according to one or more embodiments described herein.

FIG. 6 depicts a flow diagram of a method 600 for compensating for multiple non-ideal position sensor harmonic components for the rotary system of FIG. 1 according to one or more embodiments described herein. The method 600 can be implemented by any suitable system and/or device such as the processing system 120. In some examples, the processing system 120 is or includes a microcontroller, digital signal processor, FPGA, ASIC, and/or the like. It should be appreciated that, in some examples, one or more of the block depicted in FIG. 6 can be implemented by the position sensor 116.

At block 602, the processing system 120 receives an output 118 from a position sensor 116 associated with a rotor 112, the rotor 112 having an axis of rotation A, the output 118 being a measure of an angular position of the rotor 112 with respect to the axis of rotation A. At block 604, the processing system 120 generates, based on the output 118 from the position sensor 116, an error signal, an estimated angular velocity, and an estimated position (see FIG. 2). At block 606, the processing system 120 performs a position sensor harmonic adaptation (see FIG. 3) based at least in part on the error signal, the estimated angular velocity, and the estimated position to generate adaptation coefficients. At block 608, the processing system 120 performs a position sensor harmonic compensation based on the adaptation coefficients and the estimated position to generate a difference in position (see FIG. 4). At block 610, the processing system 120 controls the rotor 112 based at least in part on the difference in position.

By controlling the rotor 112 based at least in part on the difference in position (which is generated using the position sensor harmonic adaptation (FIG. 3) and the position sensor harmonic compensation (FIG. 4)), the functioning of the rotary system 100 is improved. For example, because the techniques used to control the rotor 112 are adaptable over the entire operating speed range of the motor 110, the rotary system 100 is improved.

According to one or more embodiments described herein, the method 600 can be performed multiple times to eliminate multiple harmonic components.

Additional processes also may be included, and it should be understood that the process depicted in FIG. 6 represents an illustration, and that other processes may be added or existing processes may be removed, modified, or rearranged without departing from the scope of the present disclosure.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A rotary system comprising:
   a rotor having an axis of rotation;
   a position sensor to measure an angular position of the rotor with respect to the axis of rotation;
   a processing system comprising:
      a memory comprising computer readable instructions; and
      a processing device for executing the computer readable instructions, the computer readable instructions controlling the processing device to perform operations comprising:

receiving an output from the position sensor, the output being a measure of an angular position of the rotor with respect to the axis of rotation;

generating, based on the output from the position sensor, an error signal, an estimated angular velocity, and an estimated position;

performing a position sensor harmonic adaptation based at least in part on the error signal, the estimated angular velocity, and the estimated position to generate adaptation coefficients; and performing a position sensor harmonic compensation based on the adaptation coefficients and the estimated position to generate a difference in position, wherein the position sensor harmonic adaptation is performed at a first task rate, and wherein the position sensor harmonic compensation is performed at a second task rate.

2. The system of claim 1, wherein the first task rate is slower than the second task rate.

3. The system of claim 1, wherein the rotor is disposed in an electric motor.

4. The system of claim 3, wherein the electric motor is a prime mover of a vehicle.

5. The system of claim 1, the operations further comprise: controlling the rotor based at least in part on the difference in position.

6. The system of claim 1, wherein performing the position sensor harmonic compensation further comprises performing a correlation phase determination to generate a phase angle.

7. The system of claim 6, wherein performing the correlation phase determination comprises:
calculating a phase relationship between the error signal and the output from the position sensor.

8. The system of claim 7, wherein performing the correlation phase determination comprises:
converting the phase relationship from degrees to radians and converting a frequency into a sensor speed.

9. The system of claim 8, wherein performing the correlation phase determination utilizes at least one of a look-up table or a polynomial approximation.

10. The system of claim 1, wherein performing the operations eliminates a single harmonic component.

11. The system of claim 1, wherein performing the operations eliminates a plurality of harmonic components.

12. A method comprising:
receiving, by a processing system, an output from a position sensor associated with a rotor, the rotor having an axis of rotation, the output being a measure of an angular position of the rotor with respect to the axis of rotation;

generating, by the processing system, based on the output from the position sensor, an error signal, an estimated angular velocity, and an estimated position;

performing, by the processing system, a position sensor harmonic adaptation based at least in part on the error signal, the estimated angular velocity, and the estimated position to generate adaptation coefficients;

performing, by the processing system, a position sensor harmonic compensation based on the adaptation coefficients and the estimated position to generate a difference in position; and controlling, by the processing system, the rotor based at least in part on the difference in position, wherein the position sensor harmonic adaptation is performed at a first task rate, and wherein the position sensor harmonic compensation is performed at a second task rate.

13. The method of claim 12, wherein the first task rate is slower than the second task rate.

14. The method of claim 12, wherein the rotor is disposed in an electric motor, and wherein the electric motor is a prime mover of a vehicle.

15. The method of claim 12, wherein performing the position sensor harmonic compensation further comprise:
performing a correlation phase determination to generate a phase angle;
calculating a phase relationship between the error signal and the output from the position sensor; and
converting the phase relationship from degrees to radians and converting a frequency into a sensor speed.

16. The method of claim 15, wherein performing the correlation phase determination utilizes at least one of a look-up table or a polynomial approximation.

17. The method of claim 12, further comprising eliminating a single harmonic component.

18. The method of claim 12, further comprising eliminating a plurality of harmonic components.

19. A rotary system comprising:
a rotor having an axis of rotation;
a position sensor to measure an angular position of the rotor with respect to the axis of rotation;
a processing system comprising:
a memory comprising computer readable instructions; and
a processing device for executing the computer readable instructions, the computer readable instructions controlling the processing device to perform operations comprising:
receiving an output from the position sensor, the output being a measure of an angular position of the rotor with respect to the axis of rotation;
generating, based on the output from the position sensor, an error signal, an estimated angular velocity, and an estimated position;
performing a position sensor harmonic adaptation based at least in part on the error signal, the estimated angular velocity, and the estimated position to generate adaptation coefficients; and
performing a position sensor harmonic compensation based on the adaptation coefficients and the estimated position to generate a difference in position, wherein performing the position sensor harmonic compensation further comprises performing a correlation phase determination to generate a phase angle.

\* \* \* \* \*